United States Patent
Hagihara (10) Patent No.: US 9,250,614 B2
(45) Date of Patent: Feb. 2, 2016

(54) MOTOR CONTROL APPARATUS AND MOTOR CONTROL METHOD

(71) Applicant: KABUSHIKI KAISHA YASKAWA DENKI, Kitayushu-shi (KR)

(72) Inventor: Jun Hagihara, Kitakyushu (KR)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 107 days.

(21) Appl. No.: 14/102,497

(22) Filed: Dec. 11, 2013

(65) Prior Publication Data
US 2014/0176036 A1    Jun. 26, 2014

(30) Foreign Application Priority Data
Dec. 26, 2012 (JP) ................... 2012-282058

(51) Int. Cl.
*G05B 5/01*    (2006.01)
*H02P 23/12*    (2006.01)

(52) U.S. Cl.
CPC . *G05B 5/01* (2013.01); *H02P 23/12* (2013.01)

(58) Field of Classification Search
CPC ....... H02P 23/04; B60T 8/329; B62D 5/0472; B62D 5/0463; B62D 5/046
See application file for complete search history.

(56) References Cited

U.S. PATENT DOCUMENTS

2011/0164864 A1*   7/2011   Taguchi .................... 396/55
2015/0066302 A1*   3/2015   Yang ......................... 701/42

FOREIGN PATENT DOCUMENTS

| JP | 07-261843 | 10/1995 |
| JP | 2009-118684 | 5/2009 |
| WO | WO 2009/084258 | 7/2009 |

OTHER PUBLICATIONS

Japanese Office Action for corresponding JP Application No. 2012-282058, Mar. 18, 2014.

* cited by examiner

*Primary Examiner* — Karen Masih
(74) *Attorney, Agent, or Firm* — Mori & Ward, LLP (57) ABSTRACT

A motor control apparatus includes a state quantity detector configured to output a detection signal in correspondence with a state quantity of a motor, a vibration detection unit configured to detect a disturbance vibration component of the motor based on a torque instruction and the detection signal and output a vibrational component signal in correspondence with the detection result, a speed signal generator configured to generate a speed signal based on a result of subtracting the vibration component signal from the detection signal, and a speed controller configured to generate the torque instruction based on a deviation between a speed instruction and the speed signal.

10 Claims, 6 Drawing Sheets

MOTOR CONTROL APPARATUS AND MOTOR CONTROL METHOD

CROSS-REFERENCE TO RELATED APPLICATIONS

This application is based on Japanese Patent Application No. 2012-282058 filed with the Japan Patent Office on Dec. 26, 2012, the entire content of which is hereby incorporated by reference.

BACKGROUND

1. Technical Field

This disclosure relates to a motor control apparatus and a motor control method.

2. Related Art

Conventionally, a motor control apparatus that controls a motor coupled to a mechanical load is known. With this control technology of the motor control apparatus, even in the case where a parameter of the controlled object fluctuates or disturbance acts on the controlled object, the controlled object is controlled at high response.

JP-A-07-261843 discloses, for example, the technology that controls a controlled object at high response. In this technology, use of a disturbance observer and a state observer allows accurately estimating a state quantity of a load side. The estimated state quantity is fed back to the controlled object.

SUMMARY

A motor control apparatus according to an aspect of an embodiment includes a state quantity detector, a vibration detection unit, a speed signal generator, and a speed controller. The state quantity detector is configured to output a detection signal in correspondence with a state quantity of a motor. The vibration detection unit is configured to detect a disturbance vibration component of the motor based on a torque instruction and the detection signal and output a vibrational component signal in correspondence with the detection result. The speed signal generator is configured to generate a speed signal based on a result of subtracting the vibration component signal from the detection signal. The speed controller is configured to generate the torque instruction based on a deviation between a speed instruction and the speed signal.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of a motor control apparatus and a motor control method according to this disclosure will be explained below in detail with reference to the accompanying drawings. The motor control apparatus and the motor control method are not limited to the following embodiments. In this description, the term "motor control" means a motor control well-known to those skilled in the art. The motor control includes, for example, a torque control to control a torque generated by the motor by controlling an electric current flowing in the motor, a speed control to change a speed steplessly in correspondence with a speed instruction voltage, and a position control to control a rotation angle (position) and a rotation speed (movement speed) of the motor by a position instruction.

First Embodiment

Figure 1:
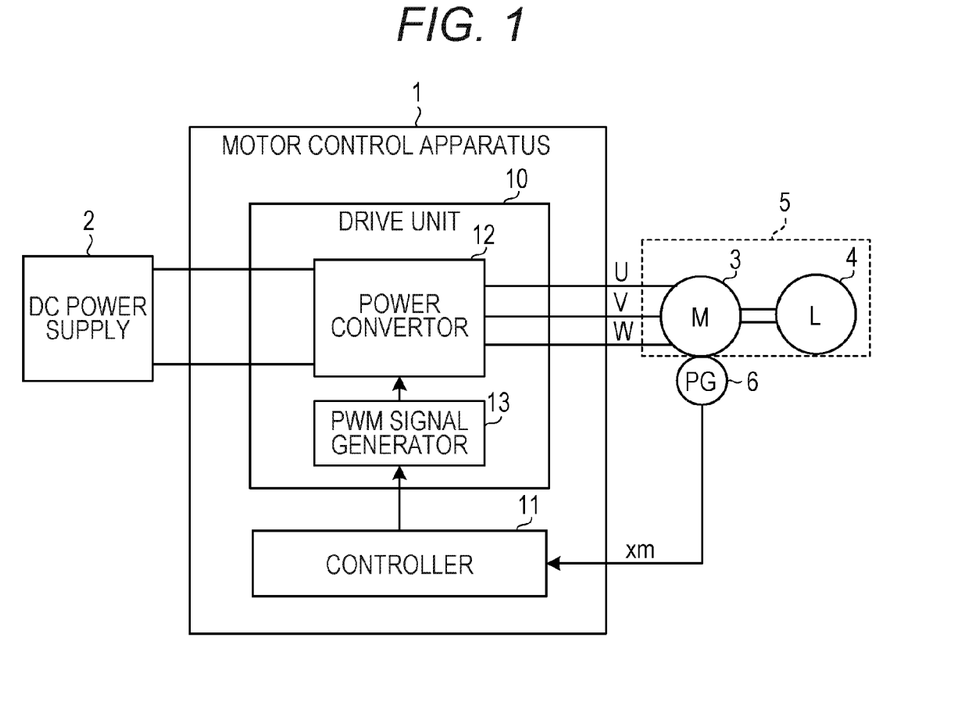
FIG. 1 is a block diagram illustrating a configuration of a motor control apparatus according to a first embodiment.

FIG. 1 is a block diagram illustrating a configuration of a motor control apparatus 1 according to the first embodiment. As illustrated in FIG. 1, the motor control apparatus 1 according to the first embodiment includes a drive unit 10 and a controller 11. The drive unit 10 includes a power convertor 12 and a PWM signal generator 13. The power convertor 12 is coupled to an external DC power supply 2. The PWM signal generator 13 sends a signal for controlling a voltage to the power convertor 12. The PWM signal generator 13 is under control of the controller 11. Accordingly, the motor control apparatus 1 converts a DC power supplied from the DC power supply 2 into a three-phase AC power with a desired frequency and voltage using the power convertor 12. The conversion is performed by a known Pulse Width Modulation (PWM) control using the PWM signal generator 13. The converted power is output to a three-phase AC motor 3 (hereinafter referred to as a motor 3).

The motor 3 is, for example, a permanent magnet synchronous motor. A mechanical load 4 is coupled to an output shaft of the motor 3. The motor 3, for example, may be a linear motor. The motor 3 is not limited to a motor with a drive function. The motor 3 may be a motor-generator or a generator with electricity generating function. The motor 3, for example, may be a generator coupled to a rotor of a wind turbine or similar part.

A position detector 6 (exemplary state quantity detection unit) detects the position of the motor 3 (rotational position of a component of the motor 3). The position detector 6 outputs a detection signal xm (hereinafter referred to as a motor position signal xm) in correspondence with a detected position. The position detector 6 is, for example, coupled to the output shaft of the motor 3. In that case, the position detector 6 detects, for example, the rotational position of the output shaft of the motor 3.

As illustrated in FIG. 1, the power convertor 12 is coupled between the DC power supply 2 and the motor 3. The power convertor 12 converts an electric current and a voltage from the DC power supply 2 in correspondence with a PWM signal supplied from the PWM signal generator 13 and supplies the motor 3 with the converted electric current and voltage. The power convertor 12 is, for example, a three-phase inverter circuit including six switching elements, which are three-phase bridge coupled together. The PWM signal generator 13 generates a PWM signal to turn ON/OFF a switching element constituting the power convertor 12 based on a control signal from the controller 11. The PWM signal is output to the power convertor 12.

The DC power supply 2 may have a configuration where an AC power is converted into a DC power, and the DC power is output. The DC power supply 2, for example, may have a configuration combining a rectifier circuit using a diode and a smoothing capacitor. In this case, an AC power supply is coupled to the input side of the rectifier circuit.

The controller 11 generates a torque instruction Tref based on the motor position signal xm of the position detector 6. The controller 11 outputs a control signal in correspondence with the torque instruction Tref to the drive unit 10.

The controller 11 removes a vibrational component of disturbance acting on the motor 3 from the motor position signal xm used for a feedback control. This configuration allows the controller 11 to increase the feedback gain of the speed control. Accordingly, the controller 11 can control a controlled object 5 including the motor 3 and the mechanical load 4 at high response. The following specifically describes the configuration of the controller 11.

Figure 2:
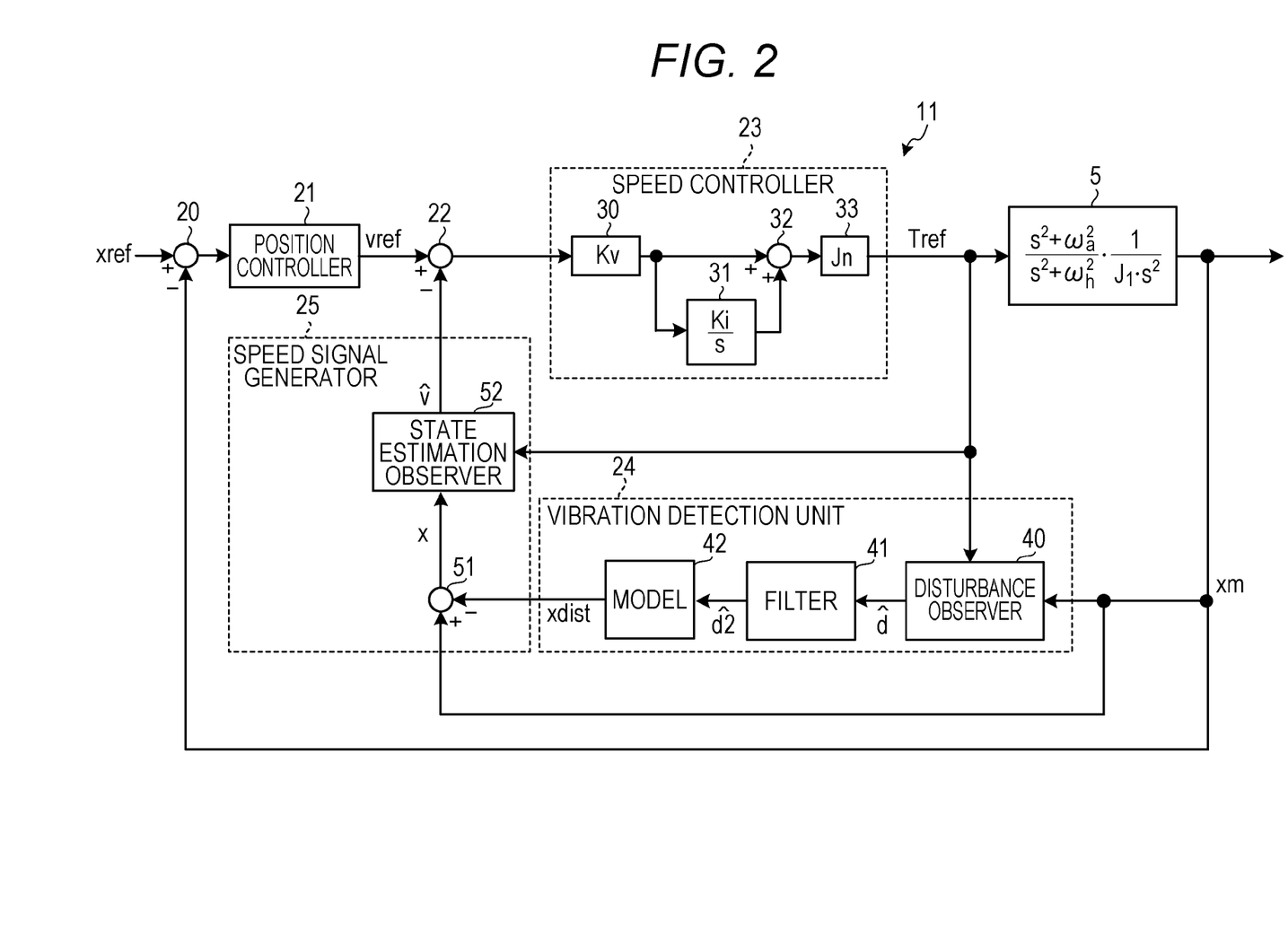
FIG. 2 is a block diagram illustrating a specific configuration of a controller of the motor control apparatus illustrated in FIG. 1.

The configuration of the controller 11 will be described in detail by referring to FIG. 2. FIG. 2 is a block diagram illustrating a specific configuration of the controller 11. As illustrated in FIG. 2, the controller 11 includes a position controller 21, subtractors 20 and 22, which are disposed at upper stream and downstream of the position controller 21, a speed controller 23, a vibration detection unit 24, and a speed signal generator 25. For convenience of explanation, in FIG. 2, a part of the configuration of the controller 11 (for example, a current controller that generates a control signal to the drive unit 10 from the torque instruction Tref) is omitted.

In the example illustrated in FIG. 2, the controlled object 5 is indicated as a mechanical resonance model. In the mechanical resonance model, an antiresonant frequency $\omega a$ is, for example, $30 \times 2 \pi [rad/s]$. A resonance frequency $\omega h$ is, for example, $40 \times 2 \pi [rad/s]$. An inertia J1 is, for example, $2.0 \times 10^{-5} [kg \cdot m^2]$.

The subtractor 20 subtracts the motor position signal xm from a position instruction xref and outputs the result to the position controller 21. The position controller 21 has a proportional control gain Kp. The position controller 21 generates a speed instruction vref by a P control (proportional control) using the proportional control gain Kp so as to make a deviation between the position instruction xref and the motor position signal xm zero, and outputs the speed instruction vref to the subtractor 22. The subtractor 22 subtracts a motor speed estimation signal v^ (exemplary speed signal) from the speed instruction vref and outputs the result to the speed controller 23.

The speed controller 23 includes a proportional controller 30, an integral controller 31, an adder 32, and a multiplier 33.

The speed controller 23 performs a PI control, which is a P control with an integral control (I control) added. That is, the speed controller 23 generates the torque instruction Tref by a PI control (proportional integral control) so as to make a deviation between the speed instruction vref and the motor speed estimation signal v^ zero.

The proportional controller 30 has a proportional gain Kv. The proportional gain Kv, for example, is set to $Kp \times 2\pi$. The integral controller 31 has an integral gain Ki. The integral gain Ki, for example, is set to $Kv/2\pi$. The multiplier 33 multiplies the output from the adder 32 using an inertia moment nominal value Jn as a coefficient. The inertia moment nominal value Jn, for example, is $J1 \times \omega h^2 / \omega a^2 [kg \cdot m^2]$.

The vibration detection unit 24 detects a disturbance vibration component of the motor 3 based on the torque instruction Tref and the motor position signal xm. The detection result is output as a vibration component position signal xdist. The vibration component position signal xdist is a signal that expresses a vibrational component included in a disturbance torque around the output shaft of the motor 3 using the vibrational component of the position of the motor 3.

The vibration detection unit 24 includes a disturbance observer 40, a filter 41, and a model 42. The disturbance observer 40 estimates a disturbance torque acting around the output shaft of the motor 3 based on the torque instruction Tref and the motor position signal xm. The estimation result is output to the filter 41 as a disturbance torque estimation signal d^. The disturbance observer 40, for example, can calculate the disturbance torque estimation signal d^ based on the following expression (1) and output the disturbance torque estimation signal d^ to the filter 41.

[Expression 1]

$$\frac{d}{dt}\begin{bmatrix} \hat{x} \\ \hat{v} \\ \hat{d} \end{bmatrix} = \begin{bmatrix} 0 & 1 & 0 \\ 0 & 0 & 1/Jn \\ 0 & 0 & 0 \end{bmatrix}\begin{bmatrix} \hat{x} \\ \hat{v} \\ \hat{d} \end{bmatrix} + \frac{1}{Jn}\begin{bmatrix} 0 \\ 1 \\ 0 \end{bmatrix}Tref + \begin{bmatrix} G1 \\ G2 \\ G3 \end{bmatrix}(xm - \hat{x}) \quad (1)$$

In the above-described expression (1), "G1 to G3" indicate an observer feedback gain. "^" indicates an estimated value. The pole of the disturbance observer 40 is, for example, set to $100 \times 2 \pi [rad/s]$. "x^" is an estimated position of the motor 3. The observer feedback gains G1 to G3 can be operated from the pole value or can be set from an external operating unit (not shown) as a setting parameter.

The vibration detection unit 24, for example, determines the frequency of the vibrational component from the disturbance torque estimation signal d^ or a disturbance torque vibration component signal d2^, which will be described below. Accordingly, the vibration detection unit 24 can change the pole of the disturbance observer 40.

The filter 41 removes a DC component and a low frequency component of the disturbance torque estimation signal d^ output from the disturbance observer 40. Accordingly, the filter 41 extracts the vibrational component of the disturbance torque. The filter 41 outputs the vibrational component to the model 42 as the disturbance torque vibration component signal d2^.

The filter 41, for example, includes two high-pass filters coupled in series. Each high-pass filter has, for example, a property expressed by the following expression (2). A cutoff frequency Kh is set lower than the pole of the disturbance observer 40.

[Expression 2]

$$\frac{s}{s+Kh} \quad (2)$$

The cutoff frequency Kh of each high-pass filter is, for example, set to 20×2 π[rad/s]. The filter 41 may include one high-pass filter or may include three or more high-pass filters coupled in series. The filter 41 may include a band pass filter instead of the high-pass filter.

The disturbance torque vibration component signal d2^ is a frequency component in a frequency band between the pole of the disturbance observer 40 and the cutoff frequency of the filter 41. In the motor control apparatus 1 according to this embodiment, the vibration frequency of the disturbance torque is set so as to be included in the frequency band between the pole of the disturbance observer 40 and the cutoff frequency of the filter 41. Accordingly, a disturbance torque vibration component signal d2^ in correspondence with the vibrational component of the disturbance torque generated around the output shaft of the motor 3 is accurately extracted.

The antiresonant frequency ωa is, for example, 30×2 π[rad/s]. The resonance frequency ωh is 40×2 π[rad/s]. These frequencies are present between the pole of the disturbance observer 40 (100×2 π[rad/s]) and the cutoff frequency of the filter 41 (20×2 π[rad/s]).

The vibration detection unit 24, for example, determines the frequency of the vibrational component from the disturbance torque estimation signal d^ or the disturbance torque vibration component signal d2^. The vibration detection unit 24 can change the cutoff frequency of the filter of the filter 41 in correspondence with the determination result.

The model 42 includes a calculator that converts a torque signal into a position signal. The model 42 calculates the vibration component position signal xdist from the disturbance torque vibration component signal d2^ output from the filter 41 and outputs the vibration component position signal xdist to the speed signal generator 25. The model 42, for example, performs a double integral where an inverse of the inertia moment nominal value Jn as shown in the model expression (3) below is set as an integral gain.

[Expression 3]

$$\frac{1}{Jn \cdot s^2} \quad (3)$$

The speed signal generator 25 includes a subtractor 51 and a state estimation observer 52. The speed signal generator 25 generates the motor speed estimation signal v^ based on a result of subtracting the vibration component position signal xdist from the motor position signal xm.

The subtractor 51 subtracts the vibration component position signal xdist from the motor position signal xm and generates a motor position signal x. The motor position signal x is a signal where the vibrational component of the disturbance torque acting around the output shaft of the motor 3 is removed from the motor position signal xm. The generated motor position signal x is output to the state estimation observer 52.

The state estimation observer 52 generates the motor speed estimation signal v^ from the torque instruction Tref and the motor position signal x. The motor speed estimation signal v^ is a signal indicating the speed estimated value of the motor 3.

The motor speed estimation signal v^ is output to the subtractor 22. The state estimation observer 52, for example, generates the motor speed estimation signal v^ based on the above-described expression (1). The pole of the state estimation observer 52, for example, is 100×2 π[rad/s]. The speed signal generator 25 can determine the frequency of the vibrational component from the disturbance torque estimation signal d^ or the disturbance torque vibration component signal d2^ and change the pole of the state estimation observer 52.

The vibrational component of the disturbance torque acting around the output shaft of the motor 3 is removed from the motor speed estimation signal v^. In view of this, a feedback loop ignoring the vibrational component of the disturbance torque is formed. Accordingly, even if the proportional gain Kv is increased and the loop gain is increased, an influence by amplification of the vibrational component of the disturbance torque can be reduced.

Accordingly, even if the controlled object 5 is a three-inertia system or a machine stand vibration system, the motor control apparatus 1 can control the controlled object 5 at high response while reducing an influence by a mechanical resonance. Even if a torque ripple occurs due to other than the mechanical resonance, the motor control apparatus 1 can control the controlled object 5 at high response. A cause for generating the torque ripple due to other than the mechanical resonance includes cogging of the motor 3, power ripple that occurs when the motor 3 is a generator, and similar cause.

Moreover, the state estimation observer 52 can ignore the frequency equal to or more than the pole of the state estimation observer 52 and generate the motor speed estimation signal v^ with a leading phase. This allows controlling the controlled object 5 at higher response. Instead of the state estimation observer 52, a differentiator may be disposed. In that case, the differentiator may generate the motor speed estimation signal v^ from the motor position signal x.

Figure 3:
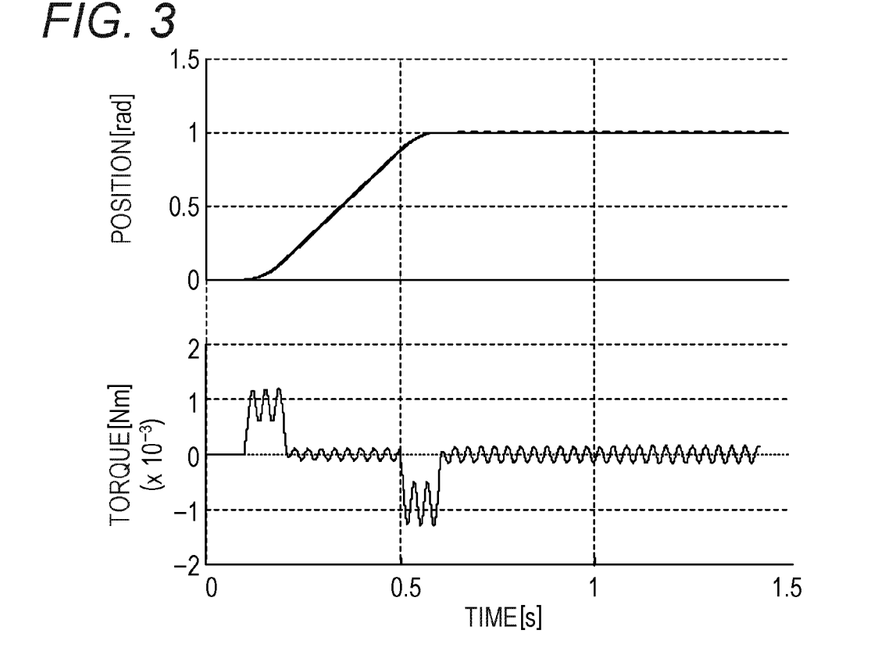
FIG. 3 is a graph illustrating a relationship between a generated torque controlled by a torque instruction (state of the torque instruction, namely, torque property) and a position (positional property of a mechanical load 4) of a mechanical load coupled to an output shaft of a motor in the case where the motor is accelerated and then decelerated with a conventional motor control apparatus.
Figure 4:
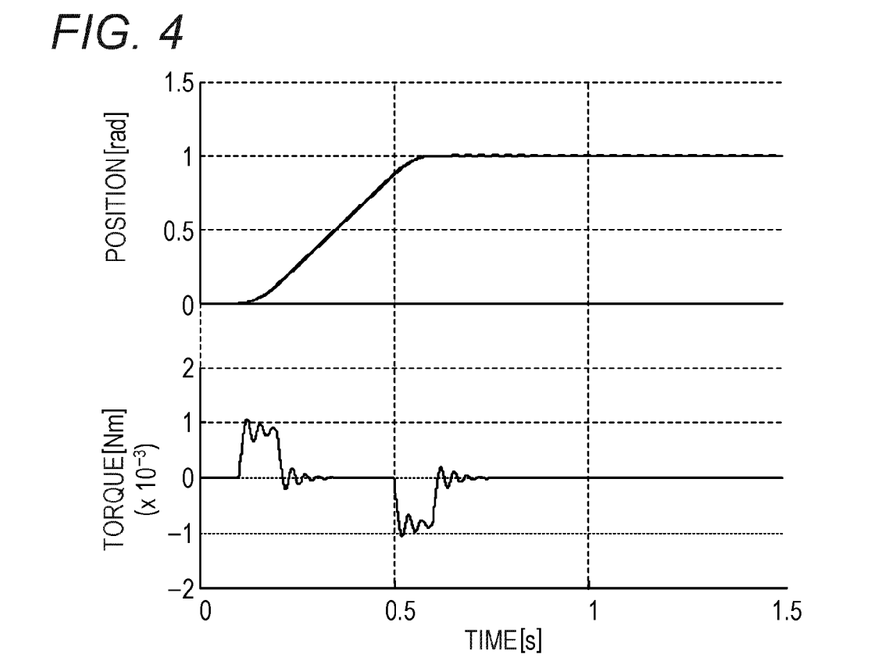
FIG. 4 is a graph illustrating a relationship between a generated torque controlled by a torque instruction (state of the torque instruction, namely, torque property) and a position (positional property of a mechanical load 4) of a mechanical load coupled to an output shaft of a motor in the case where the motor is accelerated and then decelerated with a motor control apparatus according to the first embodiment.
Figure 5:
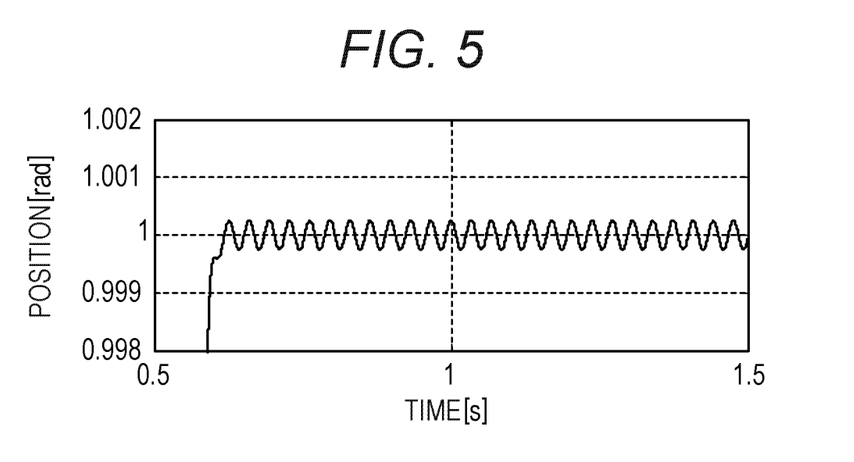
FIG. 5 is an enlarged view illustrating a part of a positional property of the mechanical load illustrated in FIG. 3.
Figure 6:
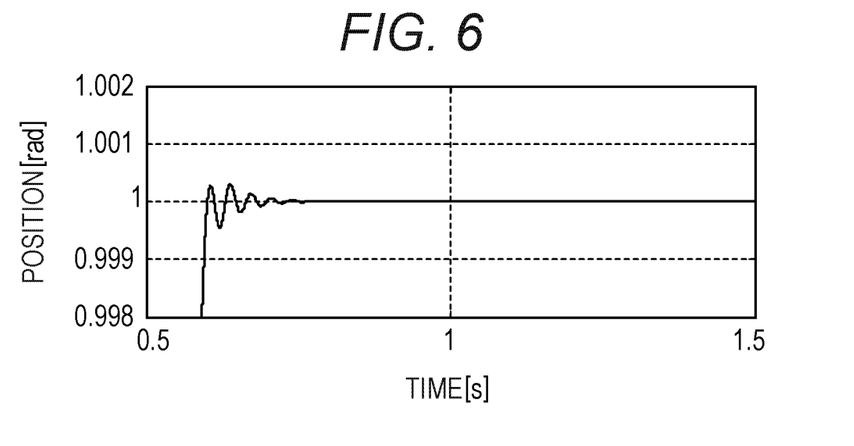
FIG. 6 is an enlarged view illustrating a part of the positional property of the mechanical load illustrated in FIG. 4.

Here, a property of the motor control apparatus 1 according to this embodiment will be described by referring to FIG. 3 to FIG. 6. FIG. 3 is a graph illustrating a relationship between a generated torque controlled by a torque instruction (state of the torque instruction, namely, torque property) and a position (positional property of a mechanical load 4) of a mechanical load 4 coupled to the output shaft of a motor 3 in the case where the motor 3 is accelerated and then decelerated with a conventional motor control apparatus. FIG. 4 is a graph illustrating a relationship between a generated torque controlled by a torque instruction (state of the torque instruction, namely, torque property) and a position (positional property of the mechanical load 4) of the mechanical load 4 coupled to the output shaft of the motor 3 in the case where the motor 3 is accelerated and then decelerated with the motor control apparatus 1 according to this embodiment. FIG. 5 is an enlarged view illustrating a part of the positional property of the mechanical load 4 illustrated in FIG. 3. FIG. 6 is an enlarged view illustrating the part of the positional property of the mechanical load 4 illustrated in FIG. 4. In the examples illustrated in FIG. 3 to FIG. 6, the proportional gain Kv at the speed controller 23 of the motor control apparatus 1 is set to the same value as the proportional gain at the speed controller of the conventional motor control apparatus.

FIG. 4 and FIG. 3 are compared for the torque property of the motor control apparatus 1. In FIG. 4 and FIG. 3, the proportional gains Kv at the speed controller 23 have the same value. Nonetheless, in the torque property of the motor control apparatus 1 according to this embodiment illustrated in FIG. 4, the ripple component is tremendously reduced compared with the ripple component included in the torque property of the conventional motor control apparatus illustrated in FIG. 3. That is, with the motor control apparatus 1 according to this embodiment, it can be seen that an influence by amplification of the vibrational component of the disturbance torque is reduced.

Next, FIG. 6 and FIG. 5 are compared for the position of the mechanical load 4 coupled to the output shaft of the motor 3. The mechanical load 4 is controlled by the motor control apparatus. In FIG. 6 and FIG. 5, the proportional gains Kv at the speed controller 23 have the same value. Nonetheless, with the positional property of the motor control apparatus 1 according to this embodiment illustrated in FIG. 6, the vibrational component is more rapidly converged than the positional property of the conventional motor control apparatus illustrated in FIG. 5. That is, with the motor control apparatus 1 according to this embodiment, it can be seen that the controlled object 5 is controlled at high response.

The motor control apparatus 1 according to the first embodiment includes the vibration detection unit 24 and the speed signal generator 25. In view of this, a feedback loop ignoring the vibrational component of the disturbance torque is formed. Accordingly, the controlled object 5 can be controlled at high response.

Second Embodiment

Next, a motor control apparatus 1A according to the second embodiment will be described. The motor control apparatus 1A according to the second embodiment determines whether to form a feedback loop ignoring the vibrational component of the disturbance torque or not, depending on the magnitude of the vibrational component of the disturbance torque. In this respect, the motor control apparatus 1A according to the second embodiment differs from the motor control apparatus 1 according to the first embodiment. Components corresponding to those in the above first embodiment are denoted by the same reference numerals, and explanation overlapping the first embodiment is appropriately omitted.

Figure 7:
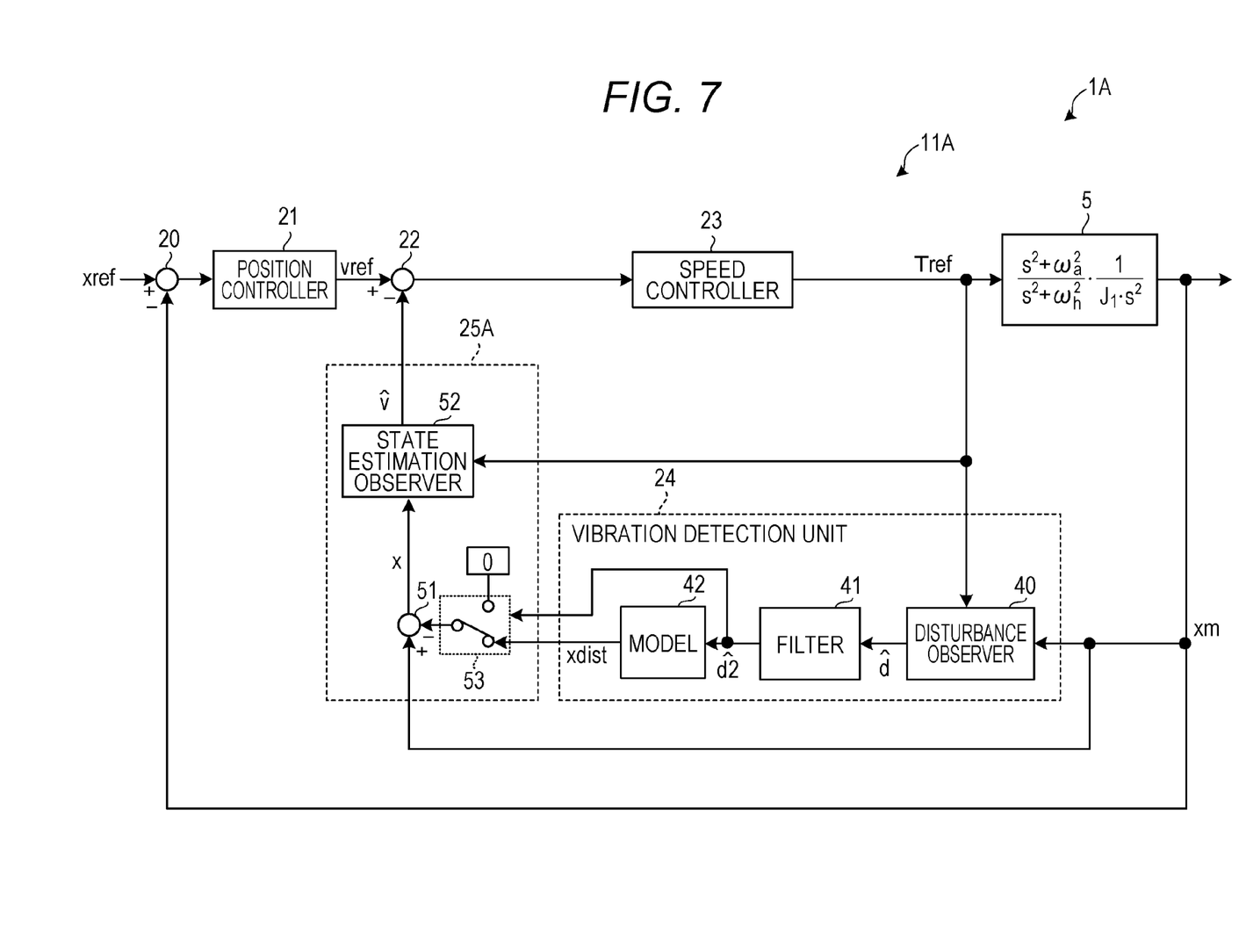
FIG. 7 is a block diagram illustrating a configuration of a motor control apparatus according to a second embodiment.

FIG. 7 is a block diagram illustrating an exemplary configuration of a controller 11A in the motor control apparatus 1A according to the second embodiment. As illustrated in FIG. 7, the motor control apparatus 1A according to the second embodiment includes the controller 11A that includes a switch 53 in a speed signal generator 25A. In this respect, the controller 11A according to the second embodiment differs from the controller 11 according to the first embodiment.

The switch 53 outputs a signal in correspondence with the value of a disturbance torque vibration component signal d2^ to the subtractor 51. In the case where the disturbance torque vibration component signal d2^ is less than a predetermined value, the switch 53 outputs a zero value to the subtractor 51. In the case where the disturbance torque vibration component signal d2^ is equal to or more than the predetermined value, the switch 53 outputs the vibration component position signal xdist to the subtractor 51.

The speed signal generator 25A generates the motor speed estimation signal v^. In the case where the vibrational component of the disturbance torque is less than the predetermined value, the speed signal generator 25A does not subtract the vibration component position signal xdist from the motor position signal xm. Then, the speed signal generator 25A generates and outputs the motor speed estimation signal v^ to the subtractor 22. Meanwhile, in the case where the vibrational component of the disturbance torque is equal to or more than the predetermined value, the speed signal generator 25A subtracts the vibration component position signal xdist from the motor position signal xm and generates and outputs the motor speed estimation signal v^ to the subtractor 22.

Thus, a feedback loop in correspondence with the small or large of the influence by the vibrational component of the disturbance torque is formed. In the case where the influence by the vibrational component of the disturbance torque is small, the feedback loop not ignoring the vibrational component of the disturbance torque is formed. In the case where the influence by the vibrational component of the disturbance torque is large, the feedback loop ignoring the vibrational component of the disturbance torque is formed. This allows the controlled object to be controlled at high response. The switch 53 may output a signal in correspondence with the disturbance torque estimation signal d^ to the subtractor 51 instead of the disturbance torque vibration component signal d2^. Here, in the case where the disturbance torque estimation signal d^ is less than a predetermined value, the switch 53 outputs a zero value to the subtractor 51. In the case where the disturbance torque estimation signal d^ is equal to or more than the predetermined value, the switch 53 outputs the vibration component position signal xdist to the subtractor 51.

The switch 53 can continuously maintain the result determined during installation of the motor control apparatus 1A (for example, the motor control apparatus 1A is in a setting mode). After, for example, the switch 53 determines that the vibrational component of the disturbance torque is equal to or more than the predetermined value, regardless of the magnitude of the vibrational component of the disturbance torque, the switch 53 subtracts the vibration component position signal xdist from the motor position signal xm and generates the motor speed estimation signal v^. After, for example, the switch 53 determines that the vibrational component of the disturbance torque is less than the predetermined value, regardless of the magnitude of the vibrational component of the disturbance torque, the switch 53 subtracts a zero value from the motor position signal xm and generates the motor speed estimation signal v^. Then, the vibration detection unit 24 stops operating.

The switch 53 may be disposed in the vibration detection unit 24 instead of the speed signal generator 25A. In the case where the switch 53 does not switch a signal to be output based on the magnitude of the vibrational component of the disturbance torque, the signal to be output may be switched by a setting using an external operating unit (not shown).

Third Embodiment

Next, a motor control apparatus 1B according to the third embodiment will be described. With the motor control apparatus 1 according to the first embodiment, as the state quantity of the motor 3, the position of the motor 3 is detected and fed back. In contrast to this, with the motor control apparatus 1B according to the third embodiment, as the state quantity of the motor 3, the speed of the motor 3 is detected and fed back. Components corresponding to those in the above first embodiment are denoted by the same reference numerals, and explanation overlapping the first embodiment is appropriately omitted.

Figure 8:
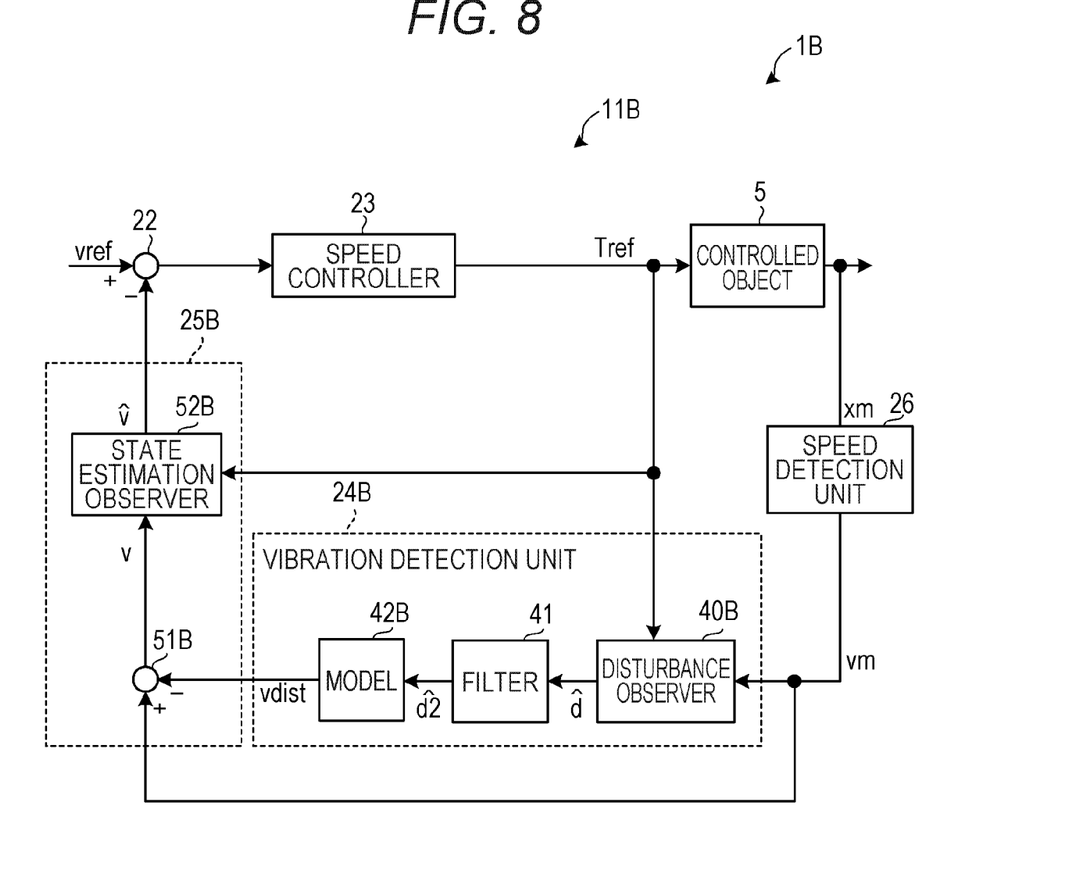
FIG. 8 is a block diagram illustrating a configuration of a motor control apparatus according to a third embodiment.

FIG. 8 illustrates an exemplary configuration of a controller 11B in the motor control apparatus 1B according to the third embodiment. As illustrated in FIG. 8, the motor control apparatus 1B according to the third embodiment includes the controller 11B that includes a speed detection unit 26 (an exemplary state quantity detection unit). The speed of the motor 3 detected by the speed detection unit 26 is fed back. Accordingly, the motor control apparatus 1B according to the third embodiment does not include the subtractor 20 and the position controller 21 illustrated in FIG. 2.

The speed detection unit 26 differentiates the motor position signal xm. Accordingly, the speed detection unit 26 generates a motor speed signal vm (an exemplary detection signal) in correspondence with the speed of the motor 3 and outputs the motor speed signal vm. A disturbance observer 40B of a vibration detection unit 24B estimates the disturbance torque acting around the output shaft of the motor 3 based on the torque instruction Tref and the motor speed signal vm. The estimation result is output to the filter 41 as the disturbance torque estimation signal d^. The disturbance observer 40B, for example, calculates the disturbance torque estimation signal d^ based on the following expression (4) and outputs the disturbance torque estimation signal d^.

[Expression 4]

$$\frac{d}{dt}\begin{bmatrix} \hat{v} \\ \hat{d} \end{bmatrix} = \begin{bmatrix} 0 & 1/Jn \\ 0 & 0 \end{bmatrix}\begin{bmatrix} \hat{v} \\ \hat{d} \end{bmatrix} + \frac{1}{Jn}\begin{bmatrix} 1 \\ 0 \end{bmatrix}Tref + \begin{bmatrix} G4 \\ G5 \end{bmatrix}(vm - \hat{v}) \qquad (4)$$

In the above-described expression (4), "G4 and G5" indicate observer feedback gains. "^" indicates an estimated value. The pole of the disturbance observer 40B is, for example, set to 100×2 π[rad/s]. The observer feedback gains G4 and G5 can be calculated from the pole value or set as the setting parameter using the external operating unit (not shown).

The filter 41 removes a DC component and the low-frequency component of the disturbance torque estimation signal d^ output from the disturbance observer 40B. Accordingly, the filter 41 extracts the vibrational component from the disturbance torque estimation signal d^. The filter 41 outputs the vibrational component to a model 42B as the disturbance torque vibration component signal d2^.

The model 42B includes a calculator that converts the torque signal into the speed signal. The model 42B calculates a vibrational component speed signal vdist from the disturbance torque vibration component signal d2^ and outputs the vibrational component speed signal vdist to a speed signal generator 25B. The vibrational component speed signal vdist is a signal that expresses the vibrational component included in the disturbance torque around the output shaft of the motor 3 using the vibrational component of the speed of the motor 3.

The model 42B, for example, performs an integral where an inverse of the inertia moment nominal value Jn as shown in the model expression (5) below is set as an integral gain. The model 42B calculates the vibrational component speed signal vdist from the disturbance torque vibration component signal d2^ output from the filter 41.

[Expression 5]

$$\frac{1}{Jn \cdot s} \qquad (5)$$

The speed signal generator 25B includes a subtractor 51B and a state estimation observer 52B. The speed signal generator 25B generates the motor speed estimation signal v^ based on the result of subtracting the vibrational component speed signal vdist from the motor speed signal vm.

The subtractor 51B subtracts the vibrational component speed signal vdist from the motor speed signal vm and generates the motor speed signal v. Accordingly, the motor speed signal v from which the vibrational component of the disturbance torque acting around the output shaft of the motor 3 is removed is output to the state estimation observer 52B.

The state estimation observer 52B generates the motor speed estimation signal v^ indicating the speed estimated value of the motor 3 from the torque instruction Tref and the motor speed signal v and outputs the motor speed estimation signal v^ to the subtractor 22. The state estimation observer 52B generates the motor speed estimation signal v^ based on, for example, the above-described expression (4). The pole of the state estimation observer 52B is, for example, 100×2 π[rad/s].

The vibrational component of the disturbance torque acting around the output shaft of the motor 3 is removed from the motor speed estimation signal v^. In view of this, the motor speed estimation signal v^ can form a feedback loop ignoring the vibrational component of the disturbance torque. Accordingly, even if the loop gain is increased, an influence by amplification of the vibrational component of the disturbance torque can be reduced.

Accordingly, even if the controlled object 5 is a three-inertia system or a machine stand vibration system, the motor control apparatus 1B can control the controlled object 5 at high response while reducing an influence by a mechanical resonance. Even if a torque ripple occurs due to other than the mechanical resonance, the motor control apparatus 1B can control the controlled object 5 at high response. A cause for generating the torque ripple due to other than the mechanical resonance includes cogging of the motor 3, power ripple that occurs when the motor 3 is a generator, and similar cause.

The motor control apparatus 1B may include a switch like the motor control apparatus 1A. Here, in the case where, for example, the disturbance torque vibration component signal d2^ is less than a predetermined value, the switch outputs a zero value to the subtractor 51B. In the case where the disturbance torque vibration component signal d2^ is equal to or more than the predetermined value, the switch outputs the vibrational component speed signal vdist to the subtractor 51B.

With the above-described motor control apparatuses 1, 1A, and 1B, the position detector 6 detects the position and the speed of the motor 3. However, this should not be construed in a limiting sense. The position detector 6 may detect the position or the speed of the motor 3 by, for example, using a change in inductance on a stator side coil winding wire in association with the rotator of the motor 3 rotating.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

The motor control apparatus of this disclosure may be the following first to seventh motor control apparatuses and the first motor control method.

A first motor control apparatus includes: a state quantity detection unit configured to output a detection signal in correspondence with a position or a speed of a motor; a vibration detection unit configured to detect a disturbance vibration component of the motor based on a torque instruction and the detection signal and output a vibrational component signal in correspondence with the detection result; a speed signal generator configured to generate a speed signal based on a result of subtracting the vibration component signal from the detection signal; and a speed controller configured to generate the torque instruction based on a deviation between a speed instruction and the speed signal.

A second motor control apparatus according to the first motor control apparatus is configured as follows. The speed signal generator includes a subtractor and a state estimation observer. The subtractor subtracts the vibrational component signal from the detection signal. The state estimation observer calculates the speed signal based on a subtraction result of the subtractor and the torque instruction.

A third motor control apparatus according to the first or the second motor control apparatus is configured as follows. The vibration detection unit includes a disturbance observer. The disturbance observer estimates a disturbance torque of the motor based on the torque instruction and the detection signal. The disturbance observer outputs a disturbance torque estimation signal in correspondence with the estimation result. The vibration detection unit generates the vibrational component signal from the disturbance torque estimation signal.

A fourth motor control apparatus according to the third motor control apparatus is configured as follows. The vibration detection unit includes a filter configured to extract a vibrational component of the disturbance torque from the disturbance torque estimation signal. The vibrational component signal is generated from the vibrational component of the disturbance torque using a predetermined model.

A fifth motor control apparatus according to the fourth motor control apparatus is configured as follows. The filter includes a high-pass filter.

A sixth motor control apparatus according to any of the above-described third to fifth motor control apparatuses is configured as follows. In the case where a vibrational component of the disturbance torque is less than a predetermined value, the speed signal generator does not subtract the vibration component signal from the detection signal and generates the speed signal. In the case where the vibrational component of the disturbance torque is equal to or more than the predetermined value, the speed signal generator subtracts the vibration component signal from the detection signal and generates the speed signal.

A seventh motor control apparatus includes: a drive unit (10) configured to convert a power supplied from a power supply into a predetermined state and output the converted power to a motor (3); a state quantity detector (6) configured to output a detection signal in correspondence with a state quantity of the motor (3); and a controller (11) configured to control an operation of the drive unit based on a detection signal output from the state quantity detector (6). The controller (11) includes a position controller (21) configured to output a speed instruction, a speed controller (23) configured to output a torque instruction, and a vibration detection unit (24, 24B). The vibration detection unit (24, 24B) is configured to detect a disturbance vibration component of the motor (3) based on the torque instruction and the detection signal and output a vibrational component signal in correspondence with the detection result. The speed signal generator (25, 25A, 25B) generates the speed signal based on a result of subtracting the vibration component signal from the detection signal. The speed controller (23) generates the torque instruction based on a deviation between the speed instruction and the speed signal.

A first motor control method includes: detecting a state quantity in correspondence with a position or a speed of a motor; detecting a disturbance vibration component of the motor based on a torque instruction and the state quantity; generating a speed signal based on a result of subtracting the disturbance vibration component from the state quantity; generating the torque instruction based on a deviation between a speed instruction and the speed signal; and controlling the motor based on the torque instruction.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor control apparatus comprising:
   a state quantity detector configured to output a detection signal in correspondence with a state quantity of a motor;
   a vibration detection unit configured to detect a disturbance vibration component of the motor based on a torque instruction and the detection signal and output a vibrational component signal in correspondence with the detection result;
   a speed signal generator configured to generate a speed signal based on a result of subtracting the vibration component signal from the detection signal; and
   a speed controller configured to generate the torque instruction based on a deviation between a speed instruction and the speed signal.

2. The motor control apparatus according to claim 1, wherein
   the motor is controlled based on the torque instruction.

3. The motor control apparatus according to claim 1, wherein
   a state quantity of the motor indicates a position or a speed of a motor.

4. The motor control apparatus according to claim 1, wherein
   the speed signal generator includes:
      a subtractor configured to subtract the vibrational component signal from the detection signal; and
      a state estimation observer configured to calculate the speed signal based on a subtraction result of the subtractor and the torque instruction.

5. The motor control apparatus according to claim 1, wherein
   the vibration detection unit includes a disturbance observer configured to estimate a disturbance torque of the motor based on the torque instruction and the detection signal, the disturbance observer being configured to output a disturbance torque estimation signal in correspondence with the estimation result, and
   the vibration detection unit is configured to generate the vibrational component signal from the disturbance torque estimation signal.

6. The motor control apparatus according to claim 5, wherein
   the vibration detection unit includes a filter configured to extract a vibrational component of the disturbance torque from the disturbance torque estimation signal, and
   the vibration detection unit is configured to generate the vibrational component signal from the vibrational component of the disturbance torque using a predetermined model.

7. The motor control apparatus according to claim 6, wherein
the filter includes a high-pass filter or a band pass filter.

8. The motor control apparatus according to claim 5, wherein
- in a case where a vibrational component of the disturbance torque is less than a predetermined value, the speed signal generator does not subtract the vibration component signal from the detection signal and generates the speed signal, and
- in a case where the vibrational component of the disturbance torque is equal to or more than the predetermined value, the speed signal generator subtracts the vibration component signal from the detection signal and generates the speed signal.

9. A motor control method comprising:
detecting a detection signal in correspondence with a state quantity of a motor;
detecting a disturbance vibration component of the motor based on a torque instruction and the state quantity;
generating a speed signal based on a result of subtracting the disturbance vibration component from the state quantity;
generating the torque instruction based on a deviation between a speed instruction and the speed signal; and
controlling the motor based on the torque instruction.

10. The motor control method according to claim 9, wherein
a state quantity of the motor indicates a position or a speed of a motor.

* * * * *